(12) United States Patent
Tamai et al.

(10) Patent No.: US 7,978,360 B2
(45) Date of Patent: Jul. 12, 2011

(54) PRINT SYSTEM

(75) Inventors: Yoshiyuki Tamai, Osaka (JP);
Tomokazu Kato, Osaka (JP);
Takatsugu Kuno, Osaka (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 330 days.

(21) Appl. No.: 12/010,288

(22) Filed: Jan. 23, 2008

(65) Prior Publication Data

US 2008/0130050 A1  Jun. 5, 2008

Related U.S. Application Data

(62) Division of application No. 10/329,467, filed on Dec. 27, 2002, now Pat. No. 7,345,779.

(30) Foreign Application Priority Data

Dec. 28, 2001  (JP) .................................. 2001-401318

(51) Int. Cl.
*G06F 3/12* (2006.01)
*G06F 15/00* (2006.01)
(52) U.S. Cl. ........................ 358/1.15; 358/1.13; 358/1.1
(58) Field of Classification Search .................. 358/1.15, 358/1.13, 1.14, 1.16, 1.18, 1.17, 1.11, 1.9, 358/1.1, 1.2, 1.6, 407, 468; 709/201, 203, 709/209; 347/2, 3, 5, 14, 23; 399/1, 8, 9, 399/11; 719/321, 327; 710/8, 15, 17, 62, 710/64, 72

See application file for complete search history.

(56) References Cited

U.S. PATENT DOCUMENTS

| | | | |
|---|---|---|---|
| 6,003,069 A | 12/1999 | Cavill | |
| 6,378,070 B1 | 4/2002 | Chan et al. | |
| 6,985,243 B1 | 1/2006 | Matsueda | |
| 7,265,867 B2 * | 9/2007 | Fu et al. ....................... | 358/1.18 |
| 2002/0140971 A1 | 10/2002 | Machida | |
| 2003/0007175 A1 | 1/2003 | Tsuda et al. | |

FOREIGN PATENT DOCUMENTS

| | | |
|---|---|---|
| JP | 09-152947 | 6/1997 |
| JP | 10-097396 | 4/1998 |
| JP | 10-235974 | 9/1998 |
| JP | 11249837 A | 9/1999 |
| JP | 2000-035869 | 2/2000 |
| JP | 2000132378 | 5/2000 |
| JP | 2000-267831 | 9/2000 |
| JP | 2000-330734 | 11/2000 |
| JP | 2000-353059 | 12/2000 |
| JP | 2003-22165 A | 1/2003 |

OTHER PUBLICATIONS

Notification of Reasons of Refusal, with English translation, issued on Jan. 9, 2007, in corresponding Japanese Application No. 2001-401318.

* cited by examiner

*Primary Examiner* — Dov Popovici
(74) *Attorney, Agent, or Firm* — Buchanan Ingersoll & Rooney PC

(57) ABSTRACT

In a print system including a server holding an application program connected to a network. In a client computer, when a print request for data obtained by the application program is received, client information and a request to make print data for the data are requested to the server. In the server, print data are made according to print control information according to the received client information, the print data is sent.

5 Claims, 8 Drawing Sheets

PRINT SYSTEM

This application is based on application No. 2001-401318 filed in Japan, the contents of which are hereby incorporated by reference.

BACKGROUND OF THE INVENTION

1. Field of the Invention

The present invention relates to a print system including an application service provider.

2. Description of Prior Art

Recently, a service model called an application service provider (ASP) becomes popular. In a print system using an application service provider, application programs are held in an application server that can be accessed through the Internet. When one of the application programs is needed, a client computer gets the application program from an application server and executes it. The data obtained is sent to and printed by a printer.

When data obtained by the application program in the application server is printed, the data is converted to a general format such as hypertext markup language (HTML) so that it can be displayed by a browser in the client computer. A printer driver for the client computer receives and converts the data with a print description language (PDL) and sends the PDL data to a printer for the client computer. However, information that cannot be displayed by the browser cannot be printed. For example, image data having a high resolution may not be printed at the high resolution. Therefore, it is preferable that the application program in the application server generates print data.

Though it is preferable that an application program in the application server generates print data, if the application program is not activated, it cannot make the print data. Therefore, when data made by the application program is printed out, a client computer gets the application program from the application server, activates the application program to make print data of the application program. Next, a printer driver generates print data and sends it to a printer.

However, application programs held in the application server include, besides programs such as a word processor or a spreadsheet of smaller data sizes, many management programs not used frequently by a business user such as group wares for personnel management, financial management, data management such as data warehouse, of larger data sizes. Then, if such an application program of larger data size is get by a client computer only for printing the data, it will take a long time for the processing and a longer time until print out thereof. Further, it is a problem that the client computer is not freed for a long time for getting the application program and for sending the print data to a printer. Further, the processing load in the application server increases due to increase in transmission times because for each printing the application program is sent to a client and sent back just after the print data is generated. Further, because a printer has a status varying with time, printing may not be possible when a print job is received. For example, if many print jobs are reserved, when a new job is transmitted, a print out may not be possible. This is ascribable to an error status or a status when another print job from a different client computer is being received. In such a case, when the application server accesses the printer though the Internet, the printer cannot accepts a job, so that it may reject to receive the job. This is unproductive access from the application server.

In order to solve these problems, it may be suggested to generate print data in the application server and send it to a printer. However, a printer has information on the configuration thereof inherent for each setting site such as default paper cassette, available paper sizes discharge option, and the like. In a network environment wherein the application server and a printer communicate through the Internet, the application server does not know the above-mentioned configuration information on the printer for the client. Thus, it is difficult to generate control information in correspondence to the configuration information on the printer (not dependent on the application program). Further, print control information according to the printer configuration information may be set for each client. For example, as to a printer wherein a print of 1200 dots per inch (dpi) can be outputted, a client may set print mode at 600 dpi as default mode, but another client may set print mode of 400 dpi as default mode. If print control information such as output resolution is different when an application program generates print data, it is a problem that print data cannot be generated according to the print control information requested by the client.

SUMMARY OF THE INVENTION

An object of the present invention is to perform printing efficiently in a network environment including an application service provider.

In one aspect of the invention, a print system comprises a server holding application programs, a client computer and a printer are connected through a network. In the client computer, a receiver accepts a print request for data obtained by an application program in the application programs held in the server, and, in response to the print request, a first sender sends client information and a request to make print data for the data obtained by the application program to the server. In the server, a receiver obtains print control information according to the received client information. Then, a data processor makes print data according to the print control information, and a second sender sends the print data.

In another aspect of the invention, a print system includes a server holding application programs, a client system and a printer are connected through a network. In the client computer, a receiver accepts a print request for data obtained by an application program in the application programs held in the server. In response to the print request, a first sender sends a print request to the server. Further, a second sender sends client information and print control information according to the client information to the server, in response to a request to send the client information and the print control information. In the server, an instruction device requests the client computer to send the client information and the print control information when the print request is accepted, and a data processor receives the client information and the print control information and makes print data by the application program according to the print control information. Then, and a print data sender sends the print data made by the application program.

An advantage of the present invention is that a time needed for printing is shortened and that printing can be performed according to print control information different for each client or the like.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
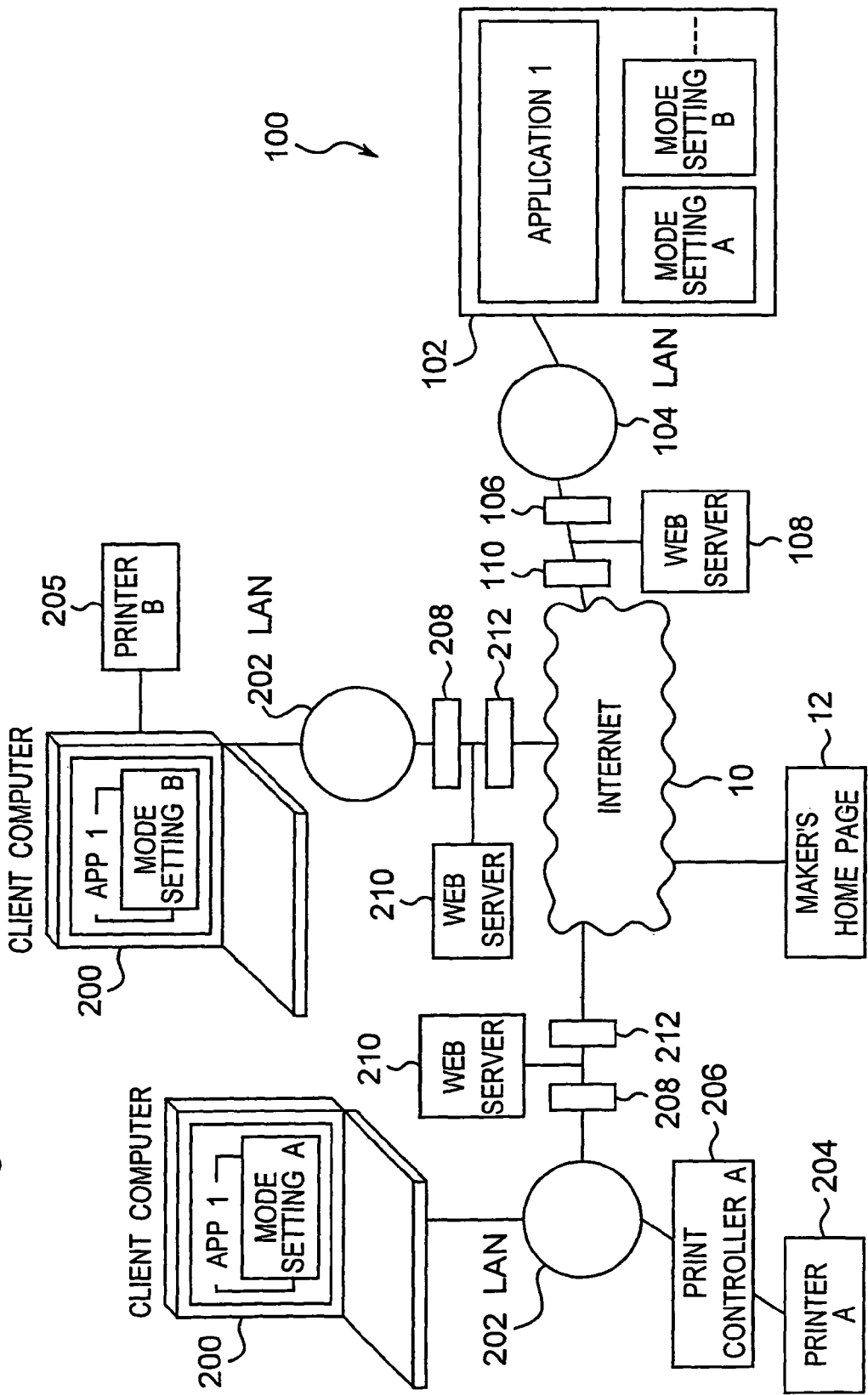
FIG. 1 is block diagram of a system including a service provider such as an application server and a client computer.

Referring now to the drawings, wherein like reference characters designate like or corresponding parts throughout the several views, FIG. 1 shows a system including an application service provider (ASP) 100, which is connected to a client computer 200 through the Internet. The application service provider 100 holds application programs. A client computer 200 can request the application service provider 100 to provide print data by executing the application program. The obtained data is printed by a printer 204. Though many client computers 200 can be connected to the application service provider 100, but for the simplicity of explanation, only one client computer 200 is shown in FIG. 1.

This system is explained further in detail. The application service provider 100 includes a computer 102 as an application server. In order to communicate with the client computer 200 or a printer controller 206, the application server 102 is connected through a local area network (LAN) 104, a fire wall device 106 and a router 110 to the Internet 10. Further, a web server 108 in the application service provider receives an access request to the application server 102 from the client computer 200 and executes a service explained below.

The application server 102 activates an application program, generates print data, converts it to printer language and sends it to the client. In this type of printing, the application server provides a program for setting a printer mode and a user interface. Then, the client provides print control information. The server 102 generates print data by changing print control information for each user or for each client computer.

On the other hand, in the client system, one or more client computers 200 are connected through LAN 202 to the print controller 206, which is connected to the printer 204. The printer 204, having a printer engine and a controller therefor, prints print data received from the print controller 206. It is to be noted that the printer 204 may be a printer (not shown) integrated with a print controller. In this case, the printer receives print data through the client computer 200.

The printer controller 206 receives a print request from a client computer 200. The client computer 200 provides the above-mentioned print control information for each user and for each client computer. Further, it receives print data from the application server 102 sends the received print data to the printer 204 for printing. Therefore, the print data is prepared based on the print control information different for each client, so that printing can be performed according to the print control information for each client.

The client computer 200 and the printer controller 206 are connected through LAN 202 and further through a fire wall device 208, a web server 210 and a router 212 to the Internet 10. The fire wall device 208 has functions such as packet filtering and proxy and passes only packets that satisfy predetermined conditions on IP address of sender (host name), IP address of destination (host name), port number of mail source, port number of destination and data. Thus, only such packets are sent through the Internet to the printer controller 206. In a transmission from an intranet to the Internet or in an access from a printer in the intranet to an application server, a reply transmission is permitted when signals are transmitted from the application server to the printer. The router 212 controls routing.

As explained above, when print data is made, the printer control information provided by a client is used. The server 102 provides a program for setting a printer mode and a user interface. The program can execute an instruction for setting a printer mode, and the client sets parameters for mode setting according to the configuration and the performance of the printer. Previously, it is general to convert the data with a general format to be displayed by a browser in the client and to send it to the printer for the client. Therefore, information which cannot be displayed by the browser cannot be printed. In this embodiment, the print control information is get by using a program for setting a printer mode, information which cannot be displayed by the browser can be printed. The print control information can be changed for each user or for each client computer. Therefore, a graphic user interface for setting a mode according to each print environment can be provided for each user. Further, mode setting is possible according to the configuration and performance of the printer. In a second embodiment, a client computer 200 uploads the program for setting a printer mode or the user interface to the server.

Figure 2:
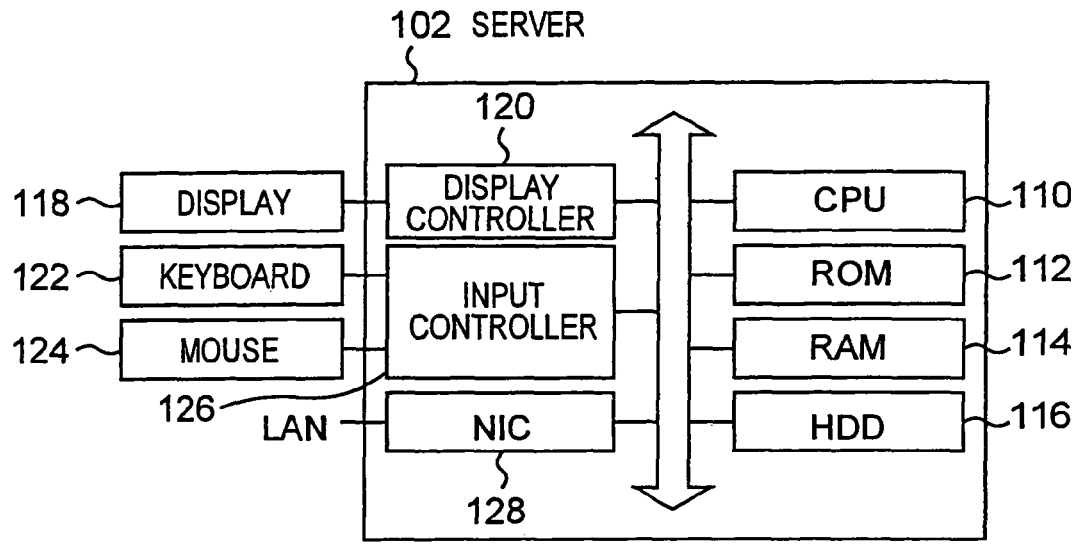
FIG. 2 is a block diagram of the application server.

The apparatuses included in the above-mentioned system are explained below in detail. FIG. 2 shows a structure of a computer as the application server 102 provided in the application service provider. The application server 102 has a central processing unit (CPU) 110, a read only memory (ROM) 112, a random access memory (RAM) 114 and a hard disk drive 116, and it is also connected through a display controller 120 to a display device 118 and through input controllers 126 to a keyboard 122 and to a mouse 124. Further, it is connected to a network interface card 128 for data transmission through LAN 104. The hard disk drive 116 stores registered information of client computers 200 including identification data for access of client computers 200 to the application server 102, e-mail addresses of client computers 200, files of application names and application data, addresses of printers used by clients, model names of printers, and names of printer drivers. Further, it stores application programs, application data and printer drivers activated by a print request from a client and different for each client. The registered information of the client computer 200 is stored in folders (or directories) in the hard disk drive 116 so that it can be rewritten and read easily.

In the application server 102, a printer driver makes print job data for application, data obtained by application programs. When a print request is accepted from a client computer 200 through the Internet 10, a printer driver is activated to make print data with print image data described with a page description language (PDL). The print data is sent to a printer designated by the client computer 200. Generally a plurality of page description languages are used, but a page description language that can be interpreted by the printer controller 206 is used.

The print job data includes job control information, page control information and print image data described in a page description language. The job control information includes control information on the printer in the unit of job such as job identifier, job name (application file name), name of job sender, a number of copies and a job processing mode (priority job, non-priority job, synthesis of jobs, division of a job or the like). The page control information includes control information for printing print data on a sheet of paper, such as document identifier, document name, double-side printing, paper size, selected paper cassette, paper discharge mode, resolution, gradation or the like. (When application data in the application server is printed, if print control information according to client information such as resolution and gradation number is not sent to the application server 102, the requested print data is not transmitted.) The print image data described in a page description language is obtained by converting the application data stored by the application program to data interpretable by the printer controller 206.

Table 1 shows an example of print job data which the printer driver sends to the printer controller 206.

TABLE 1

| | Print job data | |
|---|---|---|
| Print job control information | Job identifier, Password | ID given according to a predetermined rule |
| | Job name | given arbitrarily or according to a predetermined rule |
| | Sender of the job | Client e-mail address, Client IP address |
| | Copy number | 1-n |
| | 1st Processing mode | Synthesis, Division or the like |
| | 1st output device | Printer e-mail address, IP address, Printer ID, URL |
| | Output timing for the 1st output device | Print timing for the printer |
| | Other items | |
| Document control information | Document identifier | Serial No. |
| | Document name | Arbitrary |
| | Both sides/One side | Both sides/One side |
| | Paper size | B5, A4, B4, A3, LTL, LGL |
| | Cassette | 1st tray, 2nd tray, Automatic |
| | Discharge mode 1 | Staple/No staple |
| | Other items | |
| PDL data | | |

A printer driver makes print data interpretable by a printer controller, and makes print control information and edition control information for a document. When the printer driver is activated, an interface for operation is displayed in the display device 228, while a request is accepted through the Internet from the client computer 200. Then, the application data is converted to print image data of page description language, a print request is issued to a printer designated by the client computer 200 and sends a print job data. The printer performs print control according to the received job control information and the page control information for printing the print data.

Figure 3:
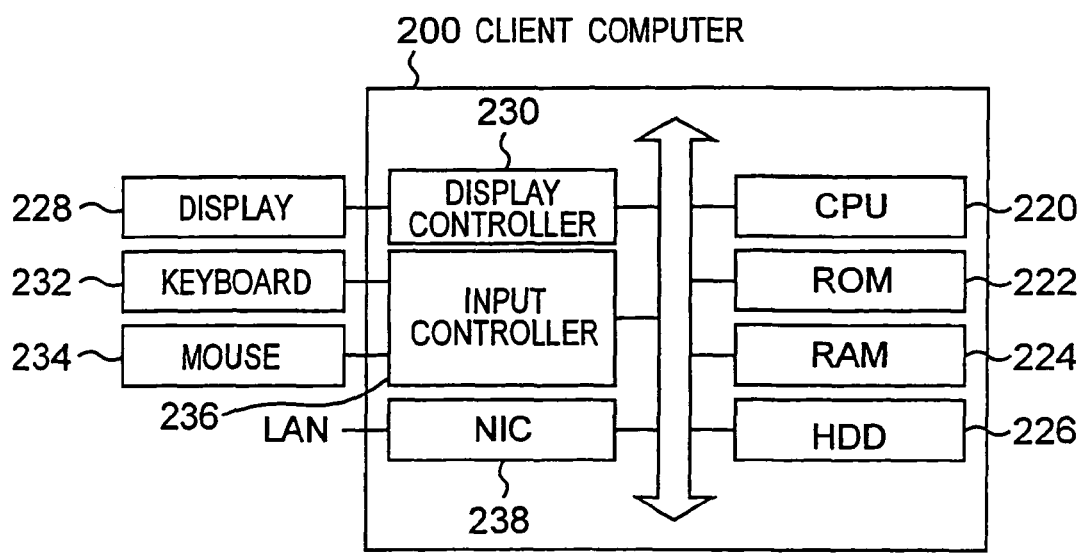
FIG. 3 is a block diagram of the client computer.

FIG. 3 shows a client computer 200. The client computer 200 has a central processing unit (CPU) 220, a read only memory (ROM) 222, a random access memory (RAM) 224 and a hard disk drive 226, and it is also connected through a display controller 230 to a display device 228 and through input controllers 236 to a keyboard 232 and to a mouse 234. Further, it is connected to a network interface card 238 for transmission of data through LAN 202. The ROM 222 and the hard disk drive 226 store a program for access to the application server, a program for getting an application program and application data from the application server, a program for requesting to make print data to the application server, and a printer driver. The ROM 222 and the hard disk drive 224 also store an e-mail address (URL) of the application server and identification data for access to the application server.

Figure 4:
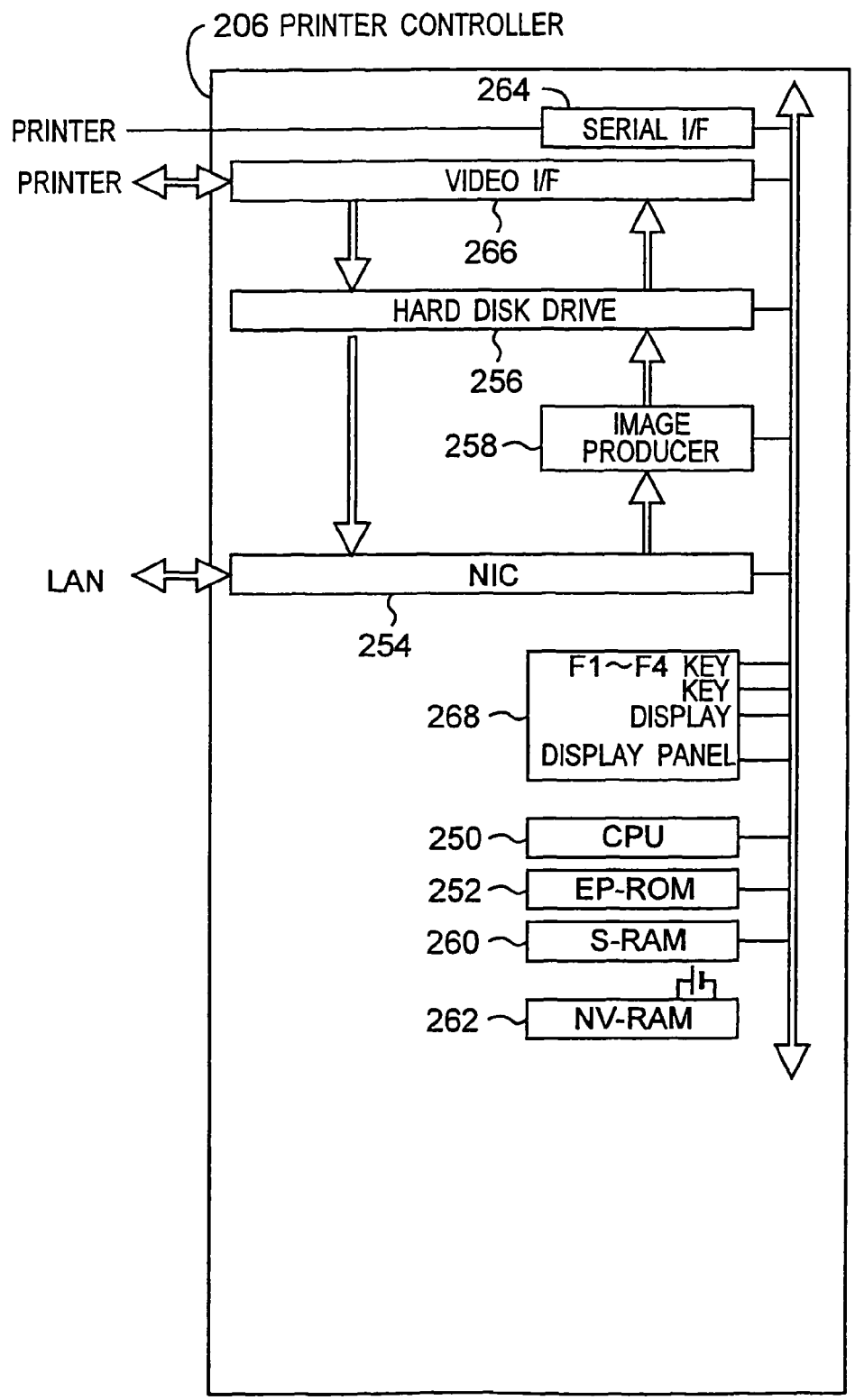
FIG. 4 is a block diagram of a printer controller.

FIG. 4 shows the printer controller 206. In the printer controller 206, a central processing unit (CPU) 250 receives print jobs from the client computers 200, manages the jobs, manages a firmware or ROM, manages image processing of print images, converts data of image information received with an e-mail, converts data of image information to be sent with an e-mail, and manages rewrite of the firmware. An electrically programmable ROM (non-volatile memory) 252 stores control programs for the above-mentioned processings. A network interface card 254 sends and receives various data through LAN, such as print jobs from the client computers 200 and image information to other printers. A hard disk drive (non-volatile memory) 256 stores print jobs received from the client computers 200 and jobs for sending image information. In an image producer 258, an interpreter converts the print data of a print job described in a page description language to intermediate codes, a font memory stores font information and font data for analyzing the intermediate codes, a random access memory (RAM) stores bit map data derived from the intermediate codes, and an image processor sends the bit map data to the RAM. A static random access memory 260 is used as a work area. A non-volatile random access memory 262 back-upped with a battery stores various setting values and management information. The non-volatile memory 262 stores an e-mail address (URL) and a password besides IP address thereof. The printer controller 206 is further connected through a serial interface 264 and a video interface to a serial interface and a video interface of the printer. Further, the printer controller 206 has an operation panel 268 for various operations.

In a print system according to a first embodiment, the application server 102 has application programs. When data obtained by one of the application programs is printed, the application server 102 converts the application data to print data directly or through a client computer 200 to a local printer 204 in the client side. In this type of printing, a program for setting a printer mode and a user interface are changed for each user or for each client computer. Thus, information which cannot be displayed by a browser but can be printed by the printer can be set on printing.

In concrete, when the application data is printed, or when the client computer 200 accepts a print request of the data obtained by the application program stored in the application server, the client computer 200 sends client information as well as a request to make print data to the application program in the application server. When the application server 102 receives the client information and the request to make print data, it instructs to acquire or read print control information according to the client information. Then, the printer 204 or the client computer 200 instructs the application server 102 to send print data to the printer 204 or the client computer 200.

If compared with a system wherein the application program is received by a client computer and the client computer sends print data to a printer, it can be omitted to send the application program to the client computer, so that a time until a print out can be shortened. Further, it is possible to set a print mode according to the structure and performance of the printer.

The printer 204 is, for example, in the same local area network as the client computer 200. The client computer 200 and the printer controller 206 communicate through the fire wall 212 and the Internet 10 with the application server 102. In such a network environment, the application server can get or read print control information according to the client information. Then, the print control information (a program for setting a mode according to printer configuration and performance) different for each client can be obtained surely, so that printing can be performed according to the print control information.

Figure 5:
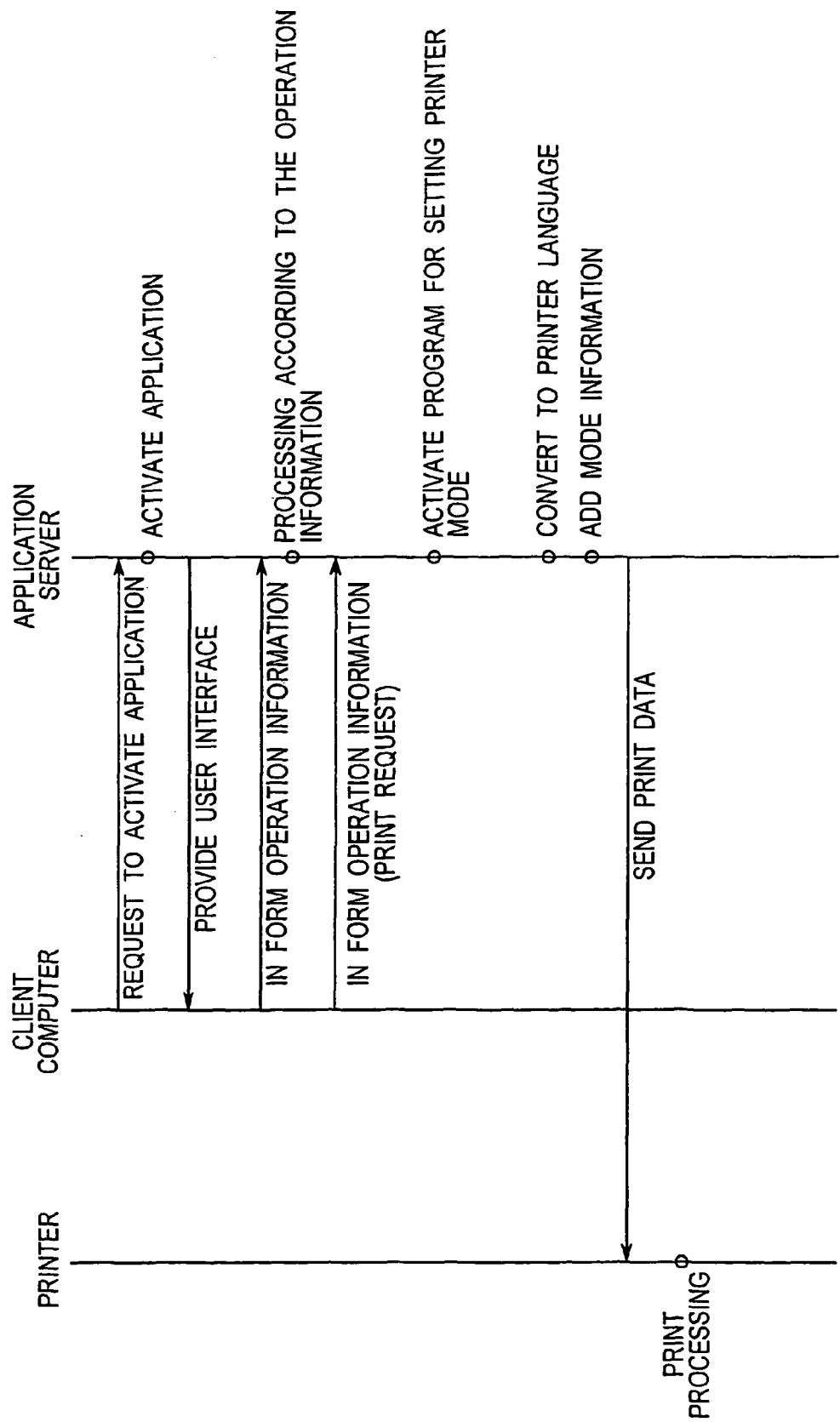
FIG. 5 is a sequence diagram in a system of a first embodiment.

FIG. 5 shows a sequence between the application server 102, the client computer 200 and the printer 204.

(1) A user requests to activate an application program at the client computer 200 (for example, by clicking an icon in a screen in a display device 228).

(2) When activation is requested from the client computer 200, the application server 102 identifies the user and activates the application program to provide a graphic user interface of the application program (a web input interface) to a client computer 200 of the user. The user is identified by an IP address or authentication data (log-in ID or the like). The authentication data is stored in the hard disk drive 226 in the server 102. When the client computer 200 informs the operation information through the web input interface, the application server 102 executes a processing according to the operation information. That is, the user operates the application program in the server to make application data.

(3) When the application server 102 receives a request to set a printer mode from the client computer 200, it is confirmed whether a program for setting a printer mode related to the user is stored or not.

(4) If the application server 102 does not store a program for setting a printer mode related to the user, a program for setting a printer mode in the application program is activated to provide a user interface for setting a printer mode to the client computer 200.

(5) If the application server 102 stores a program for setting a printer mode related to the user, the program is activated to provide a user interface for setting a printer mode to the client computer 200. The program may be provided on-line by the user, or it may be acquired from a third party. If the program is related to a user or a client computer, the program for setting a printer mode or the user interface can be changed for each user or for each client computer.

(6) In the client computer 200, the user sets a printer mode (parameters for mode setting) through the provided user interface. Thus, print control information is acquired according to client information.

(7) When the application server 102 confirms that the user completes the setting, it converts the data obtained by the application program to print data according to the printer mode set by the user. Then, the converted data is sent directly or through the client computer to the printer controller 206 in the client side. The printer prints the received print data.

Figure 6:
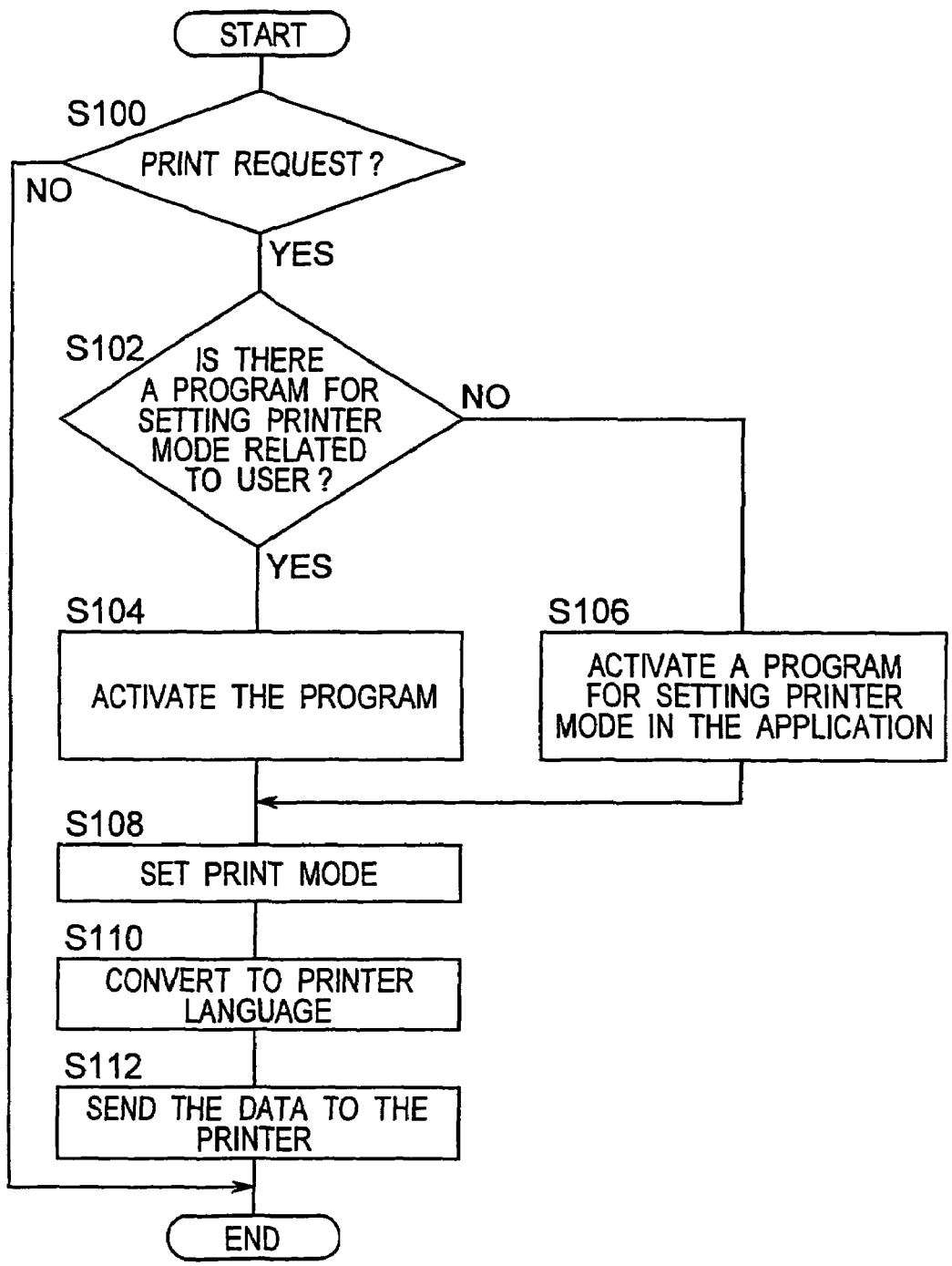
FIG. 6 is a flowchart of generating print data.

FIG. 6 is a flowchart of making print data by a printer driver in the server 102. When a print request is accepted from a client computer 200 (YES at S100), it is checked whether there is a program for setting a printer mode related to the user (S102). If the program exists, the program is activated (S104). Otherwise a program for setting a printer mode in the application program is activated (S106). Next, a print mode is set according to the setting by the user (S108), and the data is converted with a page description language according to the printer mode (S110). Then, the obtained print data is sent to the client (S112).

Next, a print system according to a second embodiment is explained. In this print system, the application server has application programs, and the data obtained by one of the application programs is printed, similarly to the first embodiment. However, the print control information obtained according to the client information is different from the first embodiment.

When the client computer accepts a print request for the data obtained by the application program held in the application server, it sends client information, a request to make print data from the application data and print control information of the application data to the application program. When the application server receives the client information, the request to make print data and the print control information, it makes print data according to the received print control information. Then, it instructs to send the data to the client computer or to the printer.

If compared with a system wherein a client computer receives the application program and sends print data to a printer, it can be omitted to send the application program to the client computer, so that a time until a print out can be shortened. Further, because print control information different for each client is sent to the application server when printing is requested, print data is made according to the print control information. Then it is possible to print data according to print control information for each client. Further, when the application server does not have print control information, it is not needed to get the print control information.

For example, when the client computer instructs printing, a print request of data obtained by the application program and stored in the application server is received. Further, the client computer is instructed to send client information, print control information according to the client information and a request to make print data from the application data according to the print control information.

Figure 7:
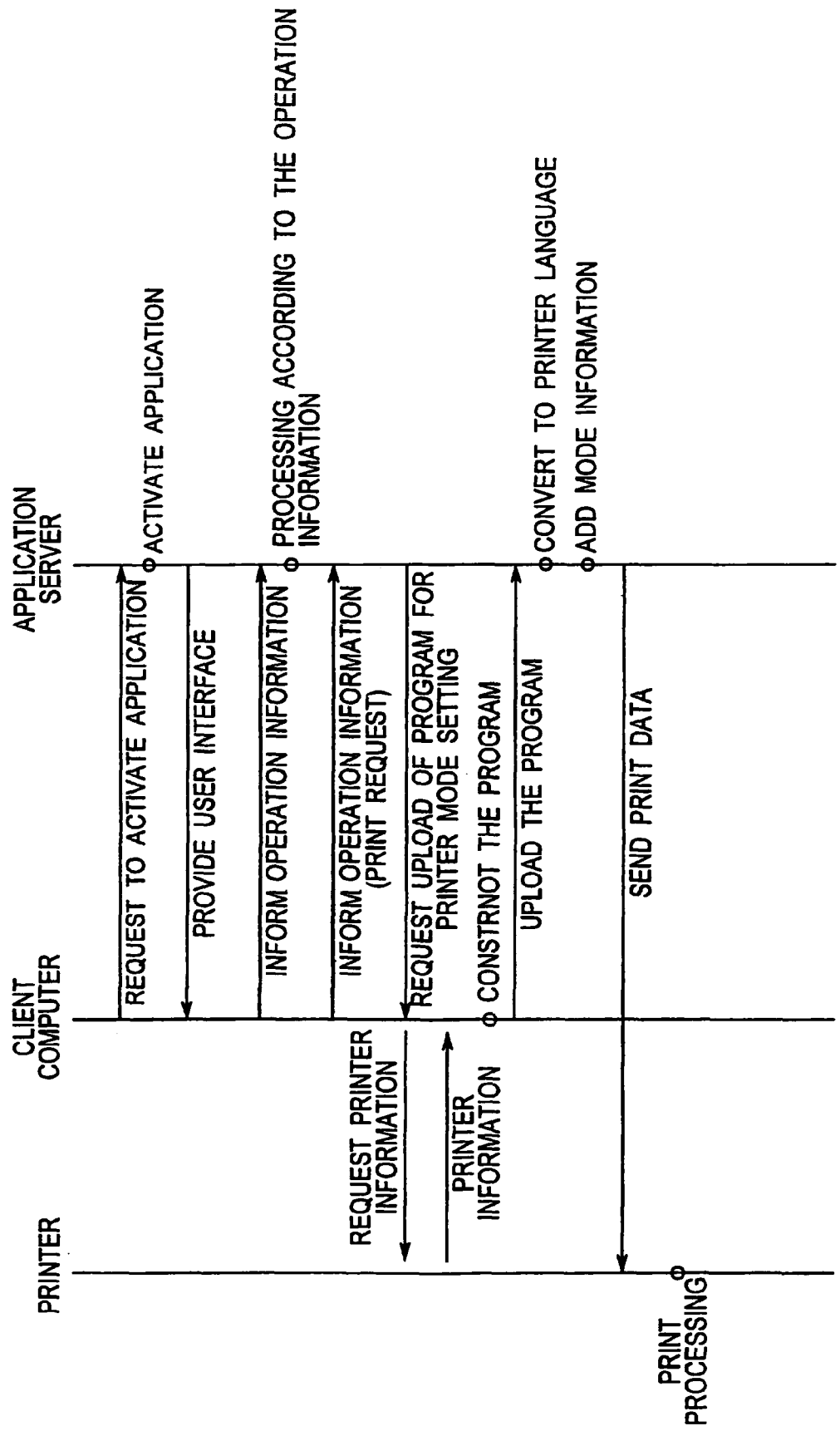
FIG. 7 is a sequence diagram in a system of a second embodiment.

FIG. 7 shows a sequence between the application server, the client computer and the printer.

(1) A user requests to activate an application program at the client computer 200 (for example, by clicking an icon in a screen in a display device 228).

(2) When the activation is requested from the client computer 200, the application server 102 identifies the user and activates the application program to provide a graphic user interface of the application program to a client computer 200 of the user. When the client computer 200 informs the operation information through the graphic user interface, the application server 102 executes a processing according to the operation information.

(3) When the application server 102 receives a request to set a printer mode from the client computer 200, the server requests the client computer to upload a program for setting a printer mode.

(4) When the client computer 200 receives the upload request, it uploads a program for setting a printer mode according to a default printer among the printers connected to the network. Alternatively, a user may select a printer in a printer list. Alternatively, a program for setting a printer mode may be stored beforehand in the client computer, or a program prepared according to printer information obtained at the upload request. The client computer 200 constructs a program for setting a printer mode and uploads the program to the application server.

(5) When the program for setting a printer mode is uploaded by the client computer 200, the application server 102 executes the program and provides a user interface for the program to the user.

(6) The user sets a printer mode with the provided user interface.

(7) When the application server 102 confirms that the user completes to set a printer mode, it converts the data obtained by the application program to print data of a page description language. Further, mode information is added.

(8) The server 102 sends the print data of the application program directly or through the client computer to the printer. The printer 204 prints the print data.

The steps of requesting upload of the program to the client computer 200 and of uploading the program by the client computer 200 may be executed before or on activating the application program.

In the above-mentioned example, the program is uploaded according to a request from the server 102. However, the client computer 200 or a user may upload it according to the connection of the printer or according to a change in the configuration of the printer.

Figure 8:
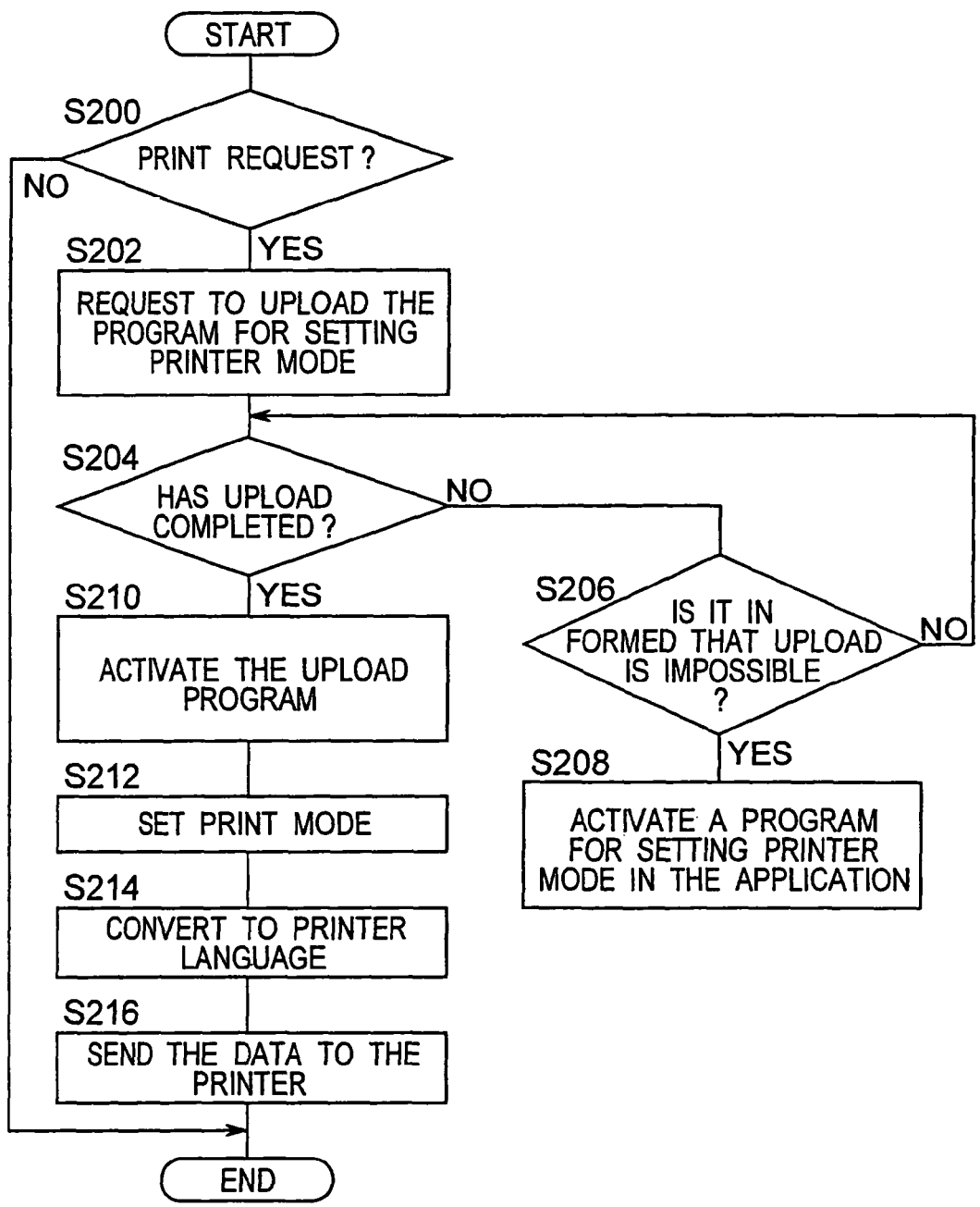
FIG. 8 is a flowchart of generating print data.

FIG. 8 shows a program of making print data by a printer driver in the server 102. When a print request is received from a client computer 200 (YES at S200), it is requested to upload a program for setting a printer mode (S202). Next it is waited that the upload is completed (YES at S204). If the upload is not completed and it is informed to be impossible (YES at S206), a program of making print data in the application program is activated (S208). If the upload is completed, the uploaded program is activated (S210). Next, a print mode is set according to the setting by the user (S212), and the data is converted with a page description language according to the printer mode (S214). Then, the obtained print data is sent to the client (S216).

Figure 9:
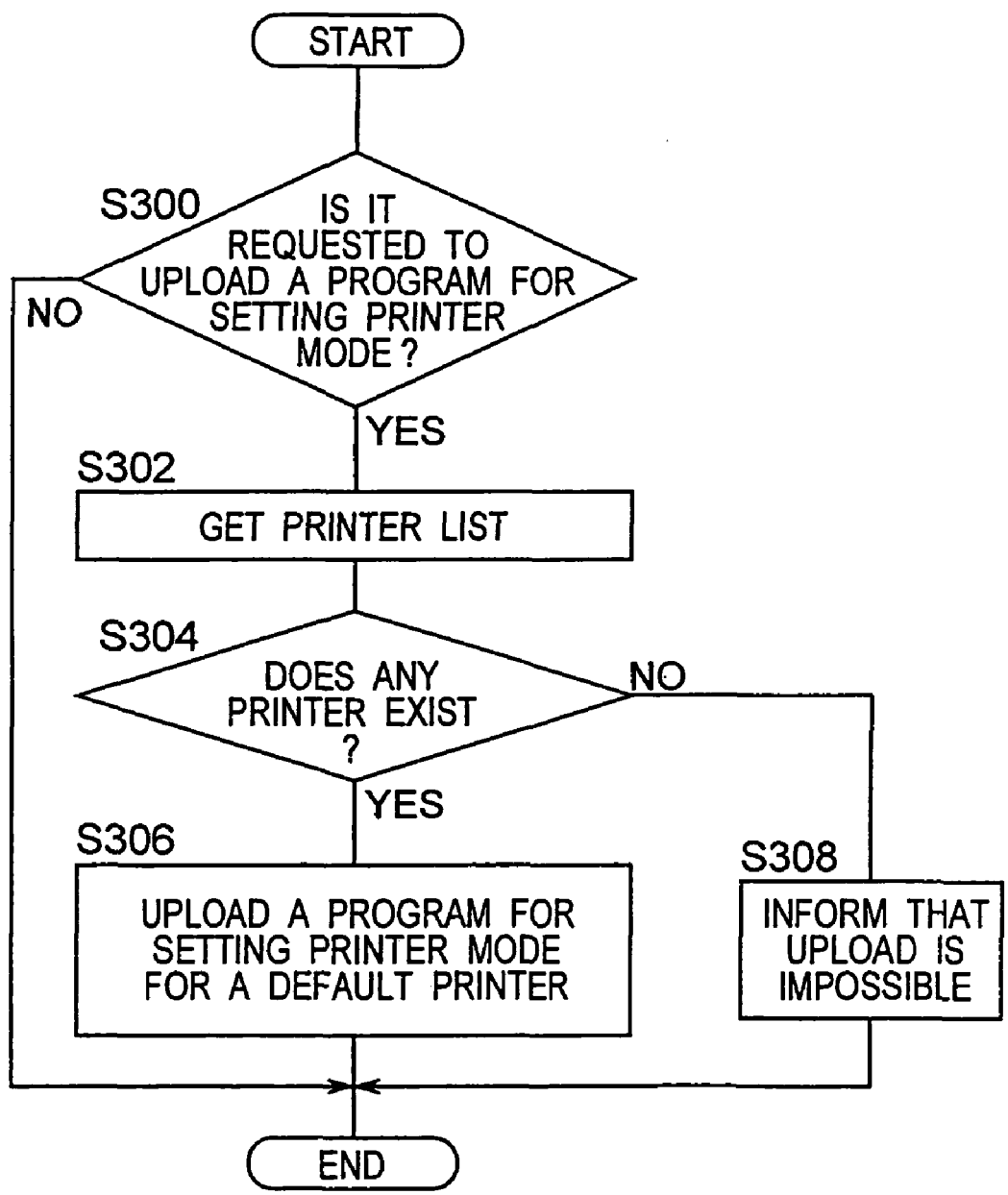
FIG. 9 is a flowchart of upload of a program for setting printer mode.

FIG. 9 shows a program to upload a program for setting a printer mode. When it is requested to upload the program (YEAS at S300), a list of printers is get (S302). Next, it is checked whether there is a printer which can be accessed by the application server (S304). A default printer may be set. If there is a printer which can be accessed, a program for setting a printer mode according to the printer is uploaded (S306). If there is not such a printer, it is informed that upload is impossible (S308).

The embodiments explained above have following advantages.

In a system wherein a server has application programs, when data obtained by one of the application programs is printed, if compared with a system wherein the application program is received by a client computer and the client computer sends print data to a printer, it can be omitted to send the application program to the client computer, so that a time until a print out can be shortened. Further, it is possible to set a print mode according to the configuration and performance of the printer.

Because print control information different for each client is sent to the application server when a print request is accepted, the print data can be made according to the print control information. Therefore, printing is possible according to the print control information for each client.

In order to upload print control information, a user interface for setting a print mode can be provided according to a print environment for each user.

When default print control information is used, it is not needed to request print control information when the application server does not have the print control information.

In a network environment wherein a printer belongs to the same local area network as a client computer and the server and the printer communicate through the Internet with each other, the server can get or read the print control information. Then, the print control information (program for setting a mode according to printer configuration and performance) different for each client can be obtained surely, so that printing can be performed according to the print control information.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A non-transitory computer readable storage medium storing a computer program executable by a computer which communicates through a network with a server holding an application program, the computer program comprising the steps of:
receiving a print request for data obtained by the application program held in the server;
sending client information and a request to make print data for the data obtained by the application program to said server; and
activating a printer mode setting program at the computer to allow a user to set print control information relating to the client information when it is determined that such a mode setting program is not stored in the server.

2. A non-transitory computer readable storage medium storing a computer program executable by a computer, the computer program comprising the steps of:
receiving client information and a request to make print data from a client for data obtained by an application program held by the computer;
obtaining from the computer print control information according to the client information when it is determined that a program for setting the print control information is stored in the computer, and obtaining from the client print control information relating to client information when it is determined that there is no program for setting the print control information stored in the computer; and
making and sending print data of the data obtained by the application program according to the print control information.

3. A non-transitory computer readable storage medium according to claim 2, wherein in the step of sending the print data, the print data is sent to a printer or to a client computer.

4. A non-transitory computer readable storage medium storing a computer program executable by a computer connected through a network to a server holding an application program, the computer program comprising the steps of:
receiving a print request for data obtained by the application program and sending the print request to the server;
uploading a printer setting mode program for setting a printer mode;
setting a printer mode comprising print control information; and
sending client information and the set printer mode comprising print control information for making print data to the server when instructed to send the client information and print control information.

5. A non-transitory computer readable storage medium storing a computer program executable by a computer connected to a network and holding an application program, the computer program comprising the steps of:
instructing a client computer connected through the network to upload a printer setting mode program for setting a printer mode, and to set a printer mode comprising print control information;
instructing the client computer to send to the computer connected to the network client information and the set printer mode comprising print control information according to the client information when a print request is received from the client computer; and
receiving the client information and the set printer mode comprising print control information, and making print data according to data obtained by the application program according to the received set printer mode comprising print control information; and
sending the print data.

* * * * *